United States Patent
Park et al.

(10) Patent No.: US 11,411,229 B2
(45) Date of Patent: Aug. 9, 2022

(54) WATER REMOVING SYSTEM AND METHOD OF FUEL CELL VEHICLE USING IMPEDANCE

(71) Applicants: Hyundai Motor Company, Seoul (KR); Kia Motors Corporation, Seoul (KR)

(72) Inventors: Gun Hyung Park, Gyeonggi-do (KR); Kyung Won Suh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 117 days.

(21) Appl. No.: 16/535,753

(22) Filed: Aug. 8, 2019

(65) Prior Publication Data

US 2020/0358114 A1   Nov. 12, 2020

(30) Foreign Application Priority Data

May 8, 2019   (KR) ........................ 10-2019-0053426

(51) Int. Cl.
| | |
|---|---|
| *H01M 8/04119* | (2016.01) |
| *H01M 8/04537* | (2016.01) |
| *H01M 8/0432* | (2016.01) |
| *H01M 8/04492* | (2016.01) |

(52) U.S. Cl.
CPC ... *H01M 8/04156* (2013.01); *H01M 8/04179* (2013.01); *H01M 8/04358* (2013.01); *H01M 8/04649* (2013.01); *H01M 8/04492* (2013.01)

(58) Field of Classification Search
CPC ......... H01M 8/04156; H01M 8/04358; H01M 8/04649; H01M 8/04492
See application file for complete search history.

(56) References Cited

U.S. PATENT DOCUMENTS

| | | | |
|---|---|---|---|
| 2009/0029200 A1* | 1/2009 | Izutani ............. | H01M 8/04231 429/415 |
| 2010/0261082 A1* | 10/2010 | Kajiwara .......... | H01M 8/04253 429/430 |
| 2010/0286939 A1* | 11/2010 | Oh ..................... | G01R 31/389 702/65 |
| 2013/0189595 A1* | 7/2013 | Izuhara ............. | H01M 8/04955 429/413 |
| 2015/0362560 A1* | 12/2015 | Jeong ................ | H01M 8/04992 429/431 |
| 2017/0352896 A1* | 12/2017 | Braillard ........... | H01M 8/04268 |
| 2018/0108925 A1* | 4/2018 | Won .................. | H01M 8/04649 |

FOREIGN PATENT DOCUMENTS

JP      5790516 B2      10/2015

\* cited by examiner

*Primary Examiner* — Matthew J Merkling
(74) *Attorney, Agent, or Firm* — Fox Rothschild LLP

(57) ABSTRACT

A water removing system and method of a fuel cell vehicle using impedance are provided. The system measures measure the low frequency impedance of a fuel cell stack when a fuel cell system is stopped in a low temperature condition, and adjusts the air supply amount and supply time for removing the water supercharged into the fuel cell stack using the measured low frequency impedance. Thus, air is prevented from being unnecessarily supercharged into the fuel cell stack and at the same time, the water remaining in the fuel cell stack is removed.

4 Claims, 4 Drawing Sheets

WATER REMOVING SYSTEM AND METHOD OF FUEL CELL VEHICLE USING IMPEDANCE

CROSS-REFERENCE TO RELATED APPLICATION

This application claims under 35 U.S.C. § 119(a) the benefit of priority to Korean Patent Application No. 10-2019-0053426 filed on May 8, 2019, the entire contents of which are incorporated herein by reference.

BACKGROUND

(a) Technical Field

The present disclosure relates to a water removing system and method of a fuel cell vehicle using impedance, and more particularly, to a water removing system and method of a fuel cell vehicle using impedance, which measures the low frequency impedance of a fuel cell stack when a fuel cell system is stopped, and appropriately removes the water remaining in the fuel cell stack.

(b) Background Art

Generally, a fuel cell system mounted in a hydrogen fuel cell vehicle includes a fuel cell stack that generates electric energy from the electrochemical reaction of a reaction gas, a hydrogen supply device that supplies hydrogen as fuel to the fuel cell stack, an air supply device that supplies air containing oxygen that is an oxidant required for the electrochemical reaction to the fuel cell stack, a heat and water managing system that optimally adjusts an operating temperature of the fuel cell stack by discharging heat, which is a by-product of the electrochemical reaction of the fuel cell stack, to the outside and performs a water managing function, etc.

The fuel cell stack is provided as a structure of stacking tens to hundreds of unit cells including a polymer electrolyte membrane, a cathode and an anode that are catalyst layers applied to both surfaces of the electrolyte membrane so that hydrogen and oxygen may react with each other, a gas diffusion layer stacked on the outsides of the cathode and the anode, a separator stacked on the outside of the gas diffusion layer, etc. The separator is provided as a structure in which a manifold and a channel, which are the flow path of hydrogen and air, and the discharging path of the water generated by the electrochemical reaction, are formed.

Meanwhile, when the fuel cell system is stopped according to the traveling termination of the fuel cell vehicle, water that is a byproduct of the electrochemical reaction remains in the fuel cell stack, and particularly, water remains in the channel of the separator, etc. As described above, when the outside air temperature is low when water remains in the fuel cell stack, the remaining water may be frozen, thereby preventing the fuel cell vehicle from starting or causing the deformation of the fuel cell stack. Therefore, when the fuel cell system is stopped, it is necessary to appropriately remove the water remaining in the fuel cell stack.

As a conventional water removing method, a method for supercharging air into a fuel cell stack by operating an air compressor that supplies the air to the fuel cell stack when the outside air temperature or the stack coolant temperature is less than a threshold temperature when the fuel cell system is stopped has been developed. More specifically, according to the conventional water removing method, the air compressor is operated in a state of previously setting the flow rate and the supply time of the air supercharged into the fuel cell stack using a qualitative method through the experiment previously, thereby supercharging the constant amount of air into the fuel cell stack.

Therefore, the water remaining in the fuel cell stack due to the flow force of the air supercharged into the fuel cell stack may be discharged to the outside of the fuel cell stack together with the airflow and removed. However, although the amount of water remaining in the fuel cell stack when the fuel cell system is stopped is changed based on the specifications and the operating method of the fuel cell system, the constant amount of air is always supercharged into the fuel cell stack by the conventional water removing method, thereby not sufficiently removing the water. Therefore, water remains in the channel of the separator, or an over-drying phenomenon may occur causing drying of the electrolyte membrane, etc.

Meanwhile, as another example of the related art a fuel cell system has been developed which may measure impedance upon removing the water inside a fuel cell to perform a water removing process (scavenging process) until the internal amount of moisture of the fuel cell reaches the optimum amount of moisture. In other words, disclosed is the fuel cell system, which as the correlation between the amount of moisture and the impedance inside the fuel cell, measures the impedance of the local portion that is a boundary position between a wet region and a dry region of a fuel cell and stops the gas supply for removing water when the impedance measurement value has become a reference threshold or greater (when the impedance increases) by a controller to terminate the water removing process, using a principle of when the amount of moisture in the fuel cell reduces, the electrolyte membrane is dried to decrease the conductivity of the electrolyte membrane and to simultaneously increase the resistance of the electrolyte membrane, and the impedance of each cell of the fuel cell measured thus increases.

However, in the related art, the water removing process is terminated when the impedance increases due to an increase in the resistance of the electrolyte membrane by excessively removing the moisture of the electrolyte membrane, etc. in addition to the water present in the channel of the separator, thereby causing the over-drying phenomenon in which the electrolyte membrane dries out, etc.

The above information disclosed in this section is merely for enhancement of understanding of the background of the disclosure and therefore it may contain information that does not form the prior art that is already known in this country to a person of ordinary skill in the art.

SUMMARY

The present disclosure provides a water removing system and method of a fuel cell vehicle using impedance, which may measure the low frequency impedance of a fuel cell stack when a fuel cell system is stopped in a low temperature condition, and adjust the air supply amount and supply time for removing the water supercharged into the fuel cell stack using the measured low frequency impedance, thereby preventing the air from being unnecessarily supercharged into the fuel cell stack, and at the same time, removing the water remaining in the channel of the separator of the fuel cell stack.

An exemplary embodiment of the present disclosure provides a water removing system of a fuel cell vehicle using impedance that may include a fuel cell stack; an air supply unit configured to supply air to the fuel cell stack; an impedance measuring unit configured to measure the low frequency impedance of the fuel cell stack; and a controller configured to operate the air supply unit based on the low frequency impedance of the fuel cell stack measured in the impedance measuring unit. The controller may be configured to drive the air supply unit when the impedance measuring unit measures the low frequency impedance of the fuel cell stack, and to reduce the driving speed of the air supply unit or stop the driving thereof when the low frequency impedance of the fuel cell stack reaches a minimum reference value.

Another exemplary embodiment of the present disclosure provides a water removing method of a fuel cell vehicle using impedance that may include confirming, by a controller, whether the outside air temperature or the coolant temperature is equal to or less than a reference value when a starting stop signal is input; measuring, by an impedance measuring unit, the low frequency impedance of a fuel cell stack when it is in a low temperature state; supplying air into the fuel cell stack by driving an air supply unit by the controller; repeatedly measuring, by the impedance measuring unit, the low frequency impedance of the fuel cell stack while the air is supplied into the fuel cell stack; and reducing the driving speed of the air supply unit or stopping the driving thereof, by the controller, when the low frequency impedance of the fuel cell stack reaches a minimum reference value.

The present disclosure provides the following effects through the above configurations. Firstly, it may be possible to measure the low frequency impedance of the fuel cell stack when the fuel cell system is stopped in a state where the outside air temperature is a low temperature, and adjust the air supply amount and supply time for removing the water supercharged into the fuel cell stack using the measured low frequency impedance, thereby preventing the air from being unnecessarily supercharged into the fuel cell stack, and at the same time, removing the water remaining in the fuel cell stack (particularly, in the channel of the separator).

In other words, it may be possible to periodically measure the low frequency impedance of the fuel cell stack when the fuel cell system is stopped in the state where the outside air temperature is a low temperature, and supply the air for removing the water to the fuel cell stack until the measured low frequency impedance reduces to reach a minimum reference value, thereby maximally removing the water remaining in the fuel cell stack (particularly, in the channel of the separator) without unnecessarily supercharging the air.

Secondly, it is only necessary to supply the air for removing the water to the fuel cell stack until the low frequency impedance reduces to reach the minimum reference value even if the amount of water remaining in the fuel cell stack is changed according to the specifications and the operating method of the fuel cell system, such that it may be possible to obtain the constant water removing effect even if the specifications and the operating method of the fuel cell system are different from each other.

Thirdly, there has been a problem in the conventional water removing method in that the water is not sufficiently removed from the channel of the separator, and thus, overdrying phenomenon causing drying of the electrolyte membrane, etc. occurs. However, in the water removing method using the low frequency impedance of the present disclosure, it may be possible to determine as the state where the water remaining in the channel of the separator has been removed when the low frequency impedance reduces to reach the minimum reference value, thereby sufficiently removing the water remaining in the channel of the separator, and therefore, preventing the over-drying phenomenon that causes drying of the electrolyte membrane, etc.

BRIEF DESCRIPTION OF THE DRAWINGS

The above and other features of the present disclosure will now be described in detail with reference to exemplary embodiments thereof illustrated the accompanying drawings which are given herein below by way of illustration only, and thus are not limitative of the present disclosure, and wherein.

Figure 1:
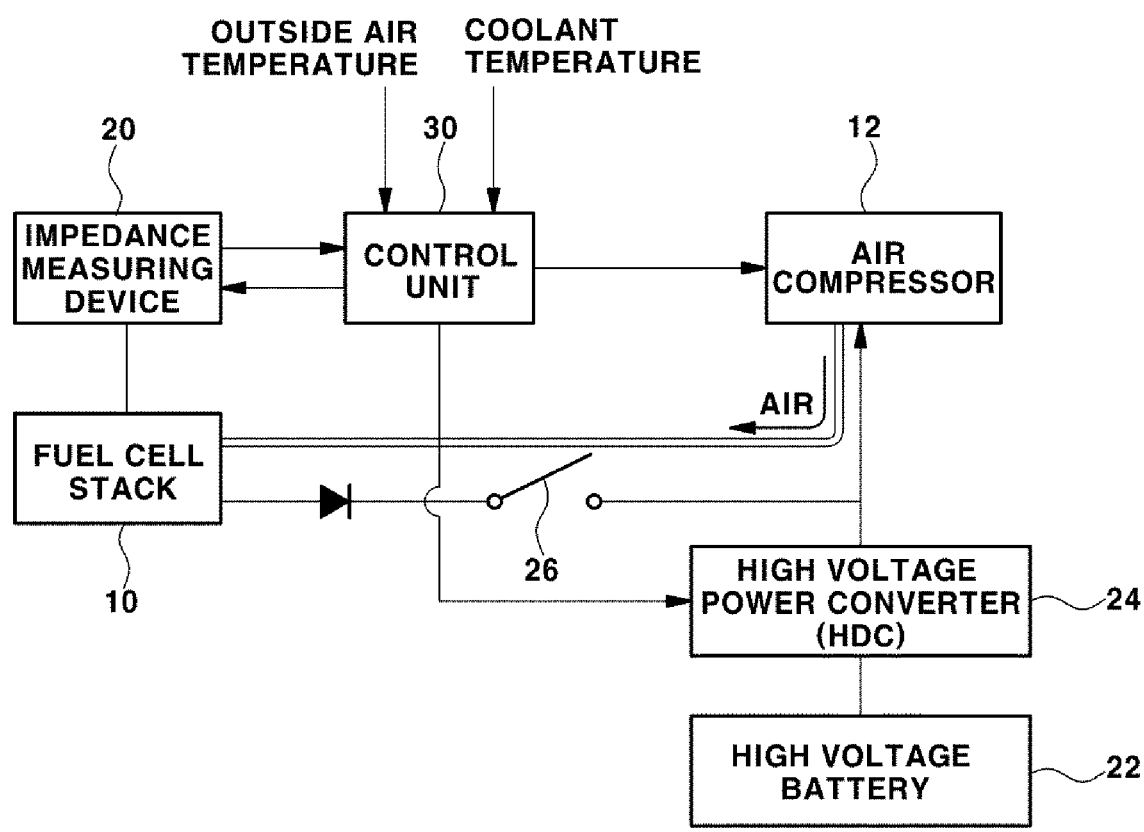
FIG. 1 is a block diagram illustrating a water removing system of a fuel cell vehicle using impedance according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment. In the drawings, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings.

FIG. 1 is a diagram illustrating a water removing system of a fuel cell vehicle using impedance according to the present disclosure, and reference numeral 10 denotes a fuel cell stack. When a fuel cell system is stopped according to the traveling termination of a fuel cell vehicle, water that is a byproduct of the electrochemical reaction remains in the fuel cell stack 10, and particularly, the water remains in a channel of a separator, etc. To remove the water remaining in the fuel cell stack 10, an air compressor 12 that is an air supply unit may be turned on by a controller 30, which is a controller for overall operation of the fuel cell system to thus supercharge air into the fuel cell stack.

According to the present disclosure, an impedance measuring device 20, which is an impedance measuring unit configured to measure the low frequency impedance, may be connected to the fuel cell stack 10. The impedance measuring device 20 may be configured to begin measuring the low frequency impedance of the fuel cell stack based on the control instruction or signal from the controller 30 before the air compressor 12 is driven (OFF state). In addition, the impedance measuring device 20 may be configured to repeatedly measure, several times, the low frequency impedance of the fuel cell stack according to the control instruction of the controller while air is supercharged into the stack according to the ON driving of the air compressor 12, that is, even while the water in the stack is removed by the air supercharged according to the ON driving of the air compressor.

In addition, a high voltage battery 22 and a high voltage power converter 24 may be connected to the fuel cell stack 10 via a switch 26, as a configuration for supplying a current for impedance measurement. The water removing system of the present disclosure may include the controller 30 for an impedance measuring procedure and an air compressor driving control. In particular, the controller 30 may be configured to transmit the control instruction for measuring the low frequency impedance of the fuel cell stack to the impedance measuring device 20, when the outside air temperature or the coolant temperature is equal to or less than a reference value in a state where the fuel cell system has been stopped.

In addition, when the impedance measuring device 20 starts measuring the low frequency impedance of the fuel cell stack, the controller 30 may be configured to turn on the air compressor 12 for supercharging air into the fuel cell stack, then perform a control for maintain the ON state or turn the air compressor 12 off based on the low frequency impedance of the fuel cell stack measured in the impedance measuring device 20, and turn off the air compressor when the low frequency impedance of the fuel cell stack reaches the minimum reference value.

Figure 2:
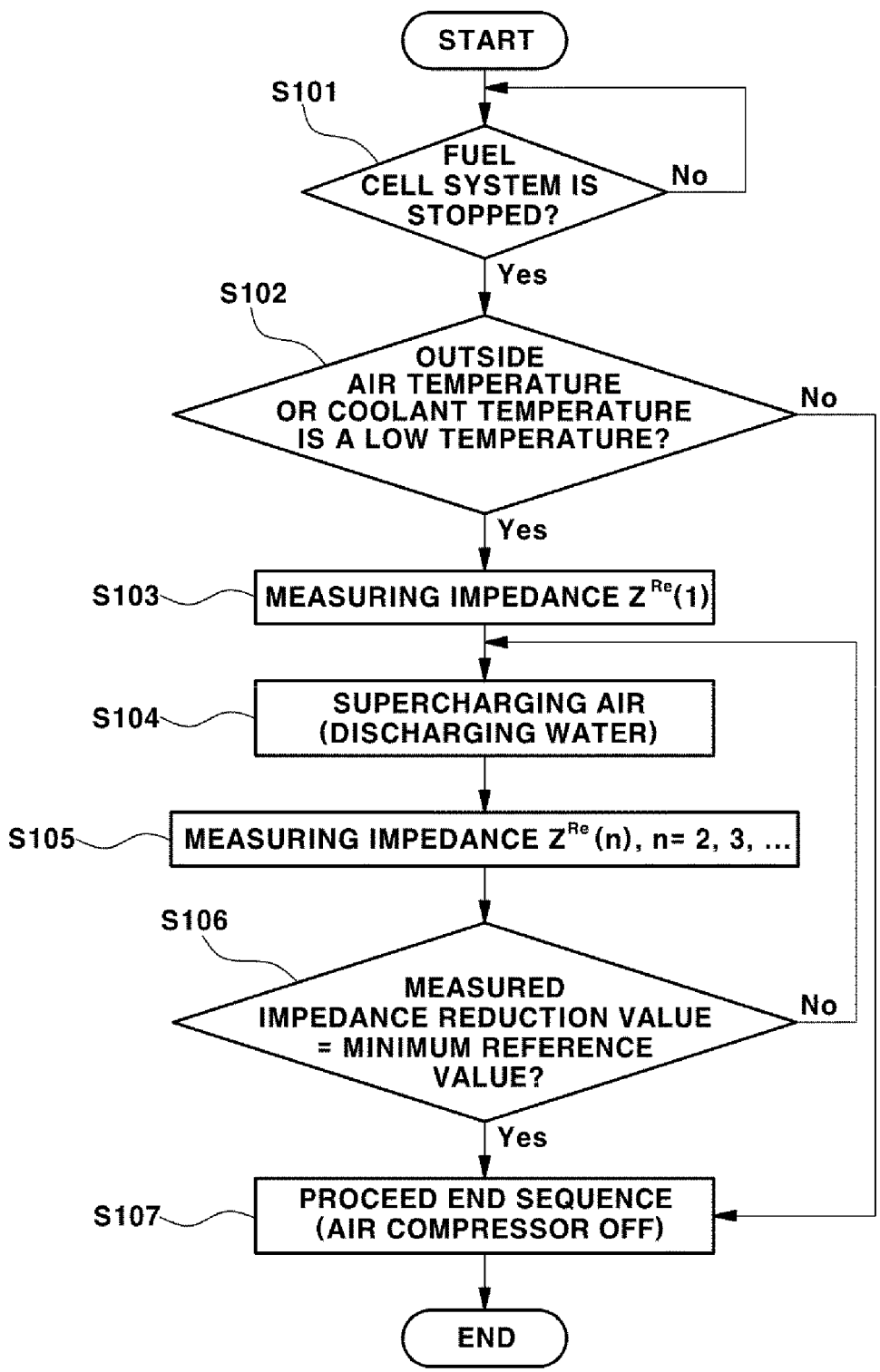
FIG. 2 is a flowchart illustrating a water removing method of the fuel cell vehicle using the impedance according to an exemplary embodiment of the present disclosure.

Herein, a water removing method using impedance of the present disclosure having the above configuration will be described as follows FIG. 2 is a flowchart illustrating a water removing method of a fuel cell vehicle using impedance according to the present disclosure.

Firstly, when the fuel cell system is stopped according to the traveling termination of the fuel cell vehicle S101, whether the fuel cell stack is in a low temperature state may be determined S102. In other words, when the fuel cell system is stopped, the controller 30 may be configured to confirm whether the outside air temperature or the coolant temperature is in a low temperature state of the reference value or less, based on a temperature signal from an outside air temperature sensor and a temperature signal from a coolant temperature sensor. Preferably, the low temperature ranges from 0° C. or more to 10° C. or less to discharge water remaining in the stack to the outside.

As a confirmed result in the S102, in response to determining that the outside air temperature or the coolant temperature is equal to or less than the reference value, the low frequency impedance $Z^{Re}(1)$ of the fuel cell stack may be measured S103. For this purpose, the current from the high voltage battery 22 may be supplied to the fuel cell stack 10 through the high voltage power converter 24 while the switch 26 is turned on or off according to the control instruction (the current command) of the controller 30, and in addition, the impedance measuring device 20 may be configured to measure the low frequency impedance $Z^{Re}(1)$ of the fuel cell stack by the control signal of the controller 30 to transmit a measurement result to the controller 30.

At this time, the frequency during measurement of the impedance of the fuel cell stack is one of the frequencies related to the mass transfer resistance of the stack (e.g., water remaining in the stack), and is preferably about 30 Hz or less experimentally, and since an impedance measurement time increases with low frequencies but the mass transfer resistance is generated, thereby improving the impedance measurement reliability. Subsequently, when the impedance measuring device starts measuring the low frequency impedance $Z^{Re}(1)$ of the fuel cell stack, air may be supercharged into the fuel cell stack to remove the water remaining in the fuel cell stack 10 S104.

In other words, the air compressor 12 may be turned ON by an operation instruction signal of the controller 30, thereby supercharging air into the fuel cell stack. Therefore, the water remaining in the fuel cell stack may be discharged to the outside and removed through the purge portion of the fuel cell stack together with the flow of air by the flow force of the air supercharged into the fuel cell stack.

Further, while the water is removed according to the operation of the air compressor 12, the low frequency impedances $Z^{Re}(n)$, n=2, 3, . . . of the fuel cell stack may be repeatedly measured several times in the same manner as the measurement method in the S103-S105. At this time, the supply time of the air supplied to the fuel cell stack 10 by the driving of the air compressor 12 that is the air supply unit may be variably adjusted by an impedance measuring period $Z^{Re}(n-1)-Z^{Re}(n)$ obtained by subtracting the currently measured low frequency impedance $Z^{Re}(n)$ from the previously measured low frequency impedance $Z^{Re}(n-1)$. In other words, the greater the impedance measuring period $Z^{Re}(n-1)-Z^{Re}(n)$, the longer the air supply time is set, and the smaller the impedance measuring period $Z^{Re}(n-1)-Z^{Re}(n)$, the shorter the air supply time is set.

Figure 3A:
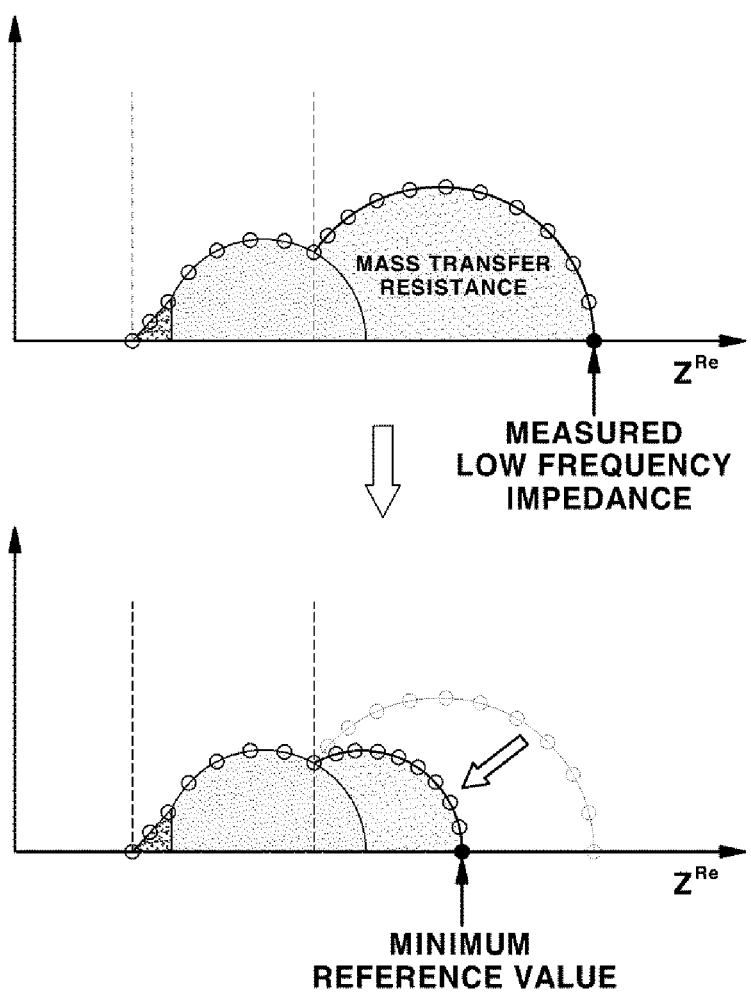
FIGS. 3A and 3B are graphs illustrating that the low frequency impedance is changed according the amount of water remaining in a fuel cell stack in the water removing system and method of the fuel cell vehicle according to an exemplary embodiment of the present disclosure.

Meanwhile, referring to the upper diagram of FIG. 3A, the low frequency impedance measured at one low frequency is high due to the mass transfer resistance (e.g., the water remaining in the stack) before the water remaining in the fuel cell stack is removed (e.g., before the S104). On the other hand, referring to the lower diagram of FIG. 3A, the mass transfer resistance (e.g., the water remaining in the stack) reduces and the low frequency impedance measured at one low frequency gradually decreases, when the water remaining in the fuel cell stack starts being removed (e.g., after the S104).

Figure 3B:
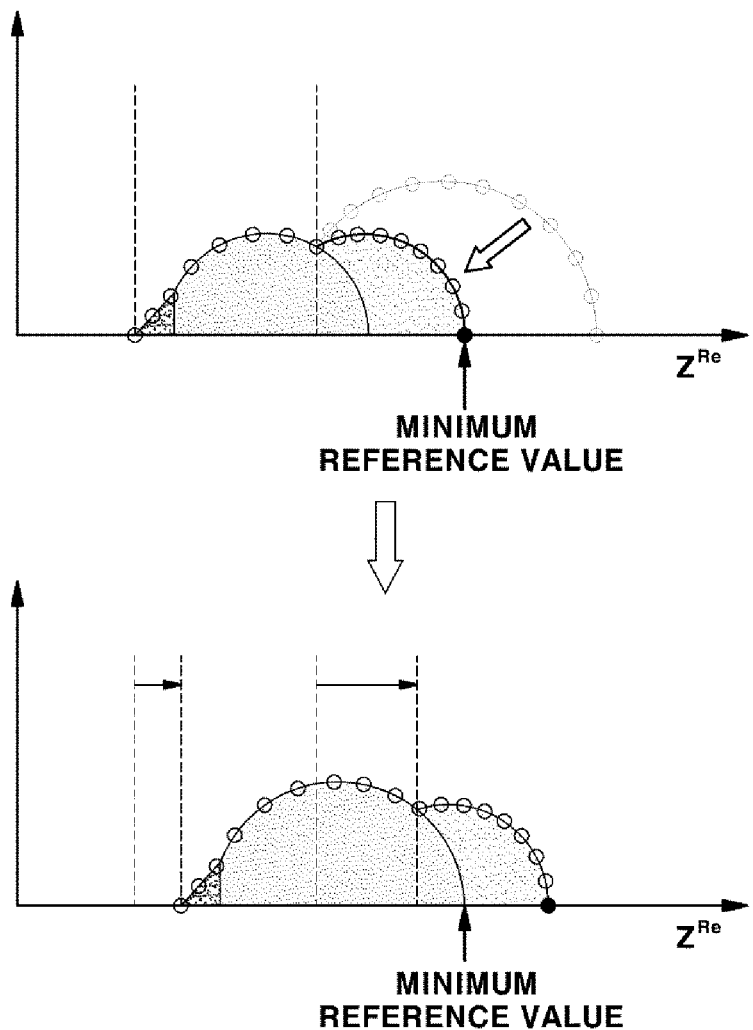

When the water remaining in the fuel cell stack is excessively removed, for example, the moisture of an electrolyte membrane, etc. is excessively removed in addition to the water present in the channel of the separator, the impedances of the low frequency band and the middle frequency band increase, as illustrated in the lower diagram of FIG. 3B, due to an increase in the resistance of the electrolyte membrane and the hydrogen ion migration resistance, etc.

Therefore, as illustrated in the lower diagram of FIG. 3A and the upper diagram of FIG. 3B, a point after the mass transfer resistance reduces and the low frequency impedance measured at one low frequency gradually decreases, and before the impedances of the low frequency band and the middle frequency band increase due to the excessive water removal in which the water present in the electrolyte membrane and the electrode of the fuel cell stack is removed may be set to a minimum reference value of the low frequency impedance.

In other words, the minimum reference value may be set to a point at which the mass transfer resistance in the stack reduces as the amount of water in the fuel cell stack gradually reduces, such that the low frequency impedance of the fuel cell stack measured at one low frequency gradually decreases to no longer decrease, and at the same time, a point before the impedances of the low frequency band and the middle frequency band entirely increase due to the excessive water removal in which the water present in the electrolyte membrane and the electrode of the fuel cell stack is removed.

Preferably, a method for determining whether the low frequency impedance of the fuel cell stack reaches the minimum reference value determines that the low frequency impedance reaches the minimum reference value when an absolute value obtained by subtracting the finally measured low frequency impedance from the previously measured low frequency impedance as in the following Equation 1, or the subtracted value as in the following Equation 2 is less than the minimum reference value.

$$|Z^{Re}(n-1) - Z^{Re}(n)| < \text{minimum reference value} \quad \text{Equation 1}$$

$$Z^{Re}(n-1) - Z^{Re}(n) < \text{minimum reference value} \quad \text{Equation 2}$$

Therefore, when the low frequency impedance of the fuel cell stack converges to the minimum reference value while the air is supercharged into the fuel cell stack to remove water, the water remaining in the channel of the separator in the stack may be determined to have been maximally removed, thereby stopping the air from being supercharged into the stack to prevent water from being excessively removed.

Accordingly, the controller 30 may be configured to determine whether the low frequency impedance $Z^{Re}(n)$, n=2, 3, ... measured by the S105 has reached the minimum reference value S106, and turn OFF the operation of the air compressor 12 when the measured low frequency impedance reaches the minimum reference value S107.

As described above, it may be possible to adjust the air supply amount and supply time for removing the water supercharged into the fuel cell stack using the low frequency impedance, and to adjust the amounts and time until before the water is excessively removed while maximally removing the water remaining in the channel of the separator, thereby preventing air from being unnecessarily supercharged and at the same time, efficiently removing the water remaining in the stack.

In other words, there has been a problem in the conventional water removing method in that the moisture present in the electrolyte membrane in addition to the water present in the channel of the separator is removed, thereby rather causing the over-drying phenomenon to occur. However, in the water removing method using the low frequency impedance of the present disclosure, it may be possible to determine as a state where the water remaining in the channel of the separator has been removed when the low frequency impedance reduces to reach the minimum reference value, thereby sufficiency removing only the water remaining in the channel of the separator, and therefore, preventing the over-drying phenomenon from occurring.

In addition, it is only necessary to supply the air for removing the water to the fuel cell stack until the low frequency impedance reduces to reach the minimum reference value even if the amount of water remaining in the fuel cell stack is changed according to the specifications and the operating method of the fuel cell system, such that it may be possible to obtain the constant water removing effect even if the specifications and the operating method of the fuel cell system are different from each other.

As described above, although the exemplary embodiments of the present disclosure have been described in detail, the claims of the present disclosure is not limited to the above-described embodiments, and various modifications and improvements by those skilled in the art using the basic concept of the present disclosure defined in the appended claims may also be included the claims of the present disclosure.

What is claimed is:

1. A water removing method of a fuel cell vehicle using impedance, comprising:
   determining, by a controller, whether an outside air temperature or a coolant temperature of the fuel cell vehicle is equal to or less than a reference value when a starting stop signal is received;
   instructing, by the controller, an impedance measuring unit to measure an initial low frequency impedance of a fuel cell stack in the fuel cell vehicle in response to determining that the outside air temperature or the coolant temperature of the fuel cell vehicle is equal to or less than the reference value;
   driving, by the controller, an air supply unit configured to supply air into the fuel cell stack when the impedance measuring unit starts to measure the initial low frequency impedance as the outside air temperature or the coolant temperature of the fuel cell vehicle is determined to be equal to or less than the reference value;
   instructing, by the controller, the impedance measuring unit to repeatedly measure a set of low frequency impedances of the fuel cell stack while the air is supplied into the fuel cell stack; and
   reducing a driving speed of the air supply unit or stopping driving the air supply unit, by the controller, when a difference between two subsequent low frequency impedances in the set of low frequency impedances of the fuel cell stack becomes less than a minimum reference value.

2. The water removing method of the fuel cell vehicle using impedance of claim 1, wherein the minimum reference value is set to a value converged after the low frequency impedances in the set of low frequency impedances decrease during water removal through operation of the air supply unit.

3. The water removing method of the fuel cell vehicle using impedance of claim 1, wherein an air supply time during which the air is supplied to the fuel cell stack by the air supply unit is set to be longer as a magnitude of an impedance measuring period between a preceding low frequency impedance in the set of low frequency impedances and a subsequent low frequency impedance in the set of low frequency impedances increases, and the air supply time is set to be shorter as the magnitude of the impedance measuring period decreases.

4. The water removing method of the fuel cell vehicle using impedance of claim 1, wherein a frequency used when the impedance measuring unit measures the initial low frequency impedance of the fuel cell stack and the set of low frequency impedances of the fuel cell stack is set to about 30 Hz or less.

* * * * *